Jan. 24, 1961  T. B. CARD  2,969,109
FUEL CONTROL FOR GAS TURBINE ENGINE
Filed Dec. 28, 1955  3 Sheets-Sheet 1

INVENTOR.
THEODORE B. CARD
BY
*R.J.Brodahl*
ATTORNEY

INVENTOR.
THEODORE B. CARD
BY
R. L. Brodahl
ATTORNEY

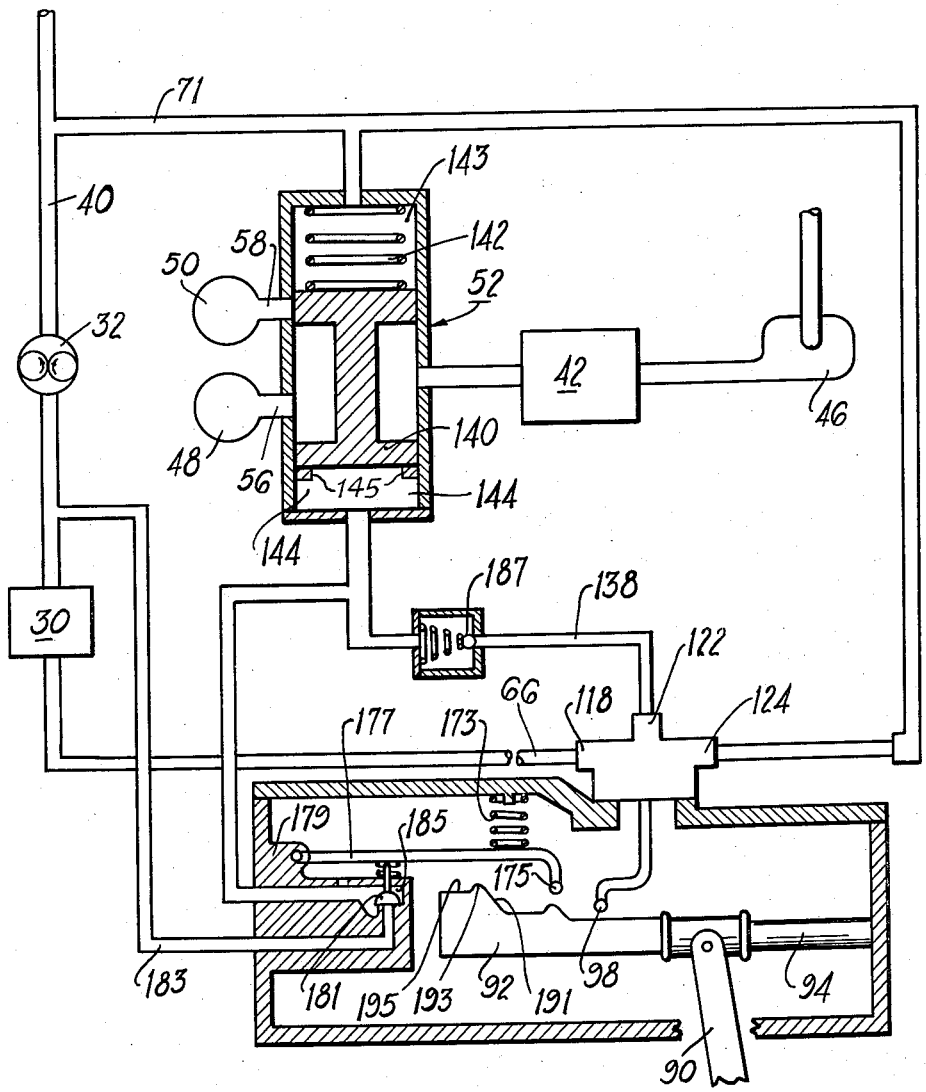

United States Patent Office 2,969,109
Patented Jan. 24, 1961

2,969,109

FUEL CONTROL FOR GAS TURBINE ENGINE

Theodore B. Card, South Bend, Ind., assignor to The Bendix Corporation, a corporation of Delaware Filed Dec. 28, 1955, Ser. No. 555,851

5 Claims. (Cl. 158—36)

This invention relates to a gas turbine engine having a tailpipe section including a plurality of afterburner fuel manifolds, and more particularly relates to fuel control apparatus or means for the afterburner or thrust augmentation fuel supplied to these afterburner fuel manifolds.

It is an object of the present invention to provide an improved fuel control apparatus for a gas turbine engine.

It is another object of the present invention to provide an improved fuel control apparatus for a gas turbine engine, which fuel control apparatus is less complicated and more dependable and reliable in operation.

It is a different object of the present invention to provide an improved fuel control apparatus which supplies fuel to a gas turbine engine in a first manner when the engine control throttle is in one position and supplies fuel to the engine in a second manner when the engine control throttle is in another position.

It is a further object to provide an improved fuel control apparatus which is operative to switch the supply of afterburner fuels from one fuel manifold to another fuel manifold as desired, or instead may be operative to switch from one fuel manifold only to more than one fuel manifold as may be desired.

It is an additional object of the present invention to provide an automatically operative fuel control apparatus for supplying the afterburner fuel to a gas turbine engine as desired and as a function of fuel flow to the engine.

It is a still further object to provide a more stable fuel control apparatus having a built in hysteresis characteristic to avoid the undesirable on and off operation of the afterburner fuel supply at any one position of the control throttle member.

These and other objects and advantages of the present invention will become apparent in view of the following description taken in conjunction with the drawings wherein:

Figure 3 is a schematic view of a modification of the fuel control apparatus in accordance with the present invention.

Figure 1:
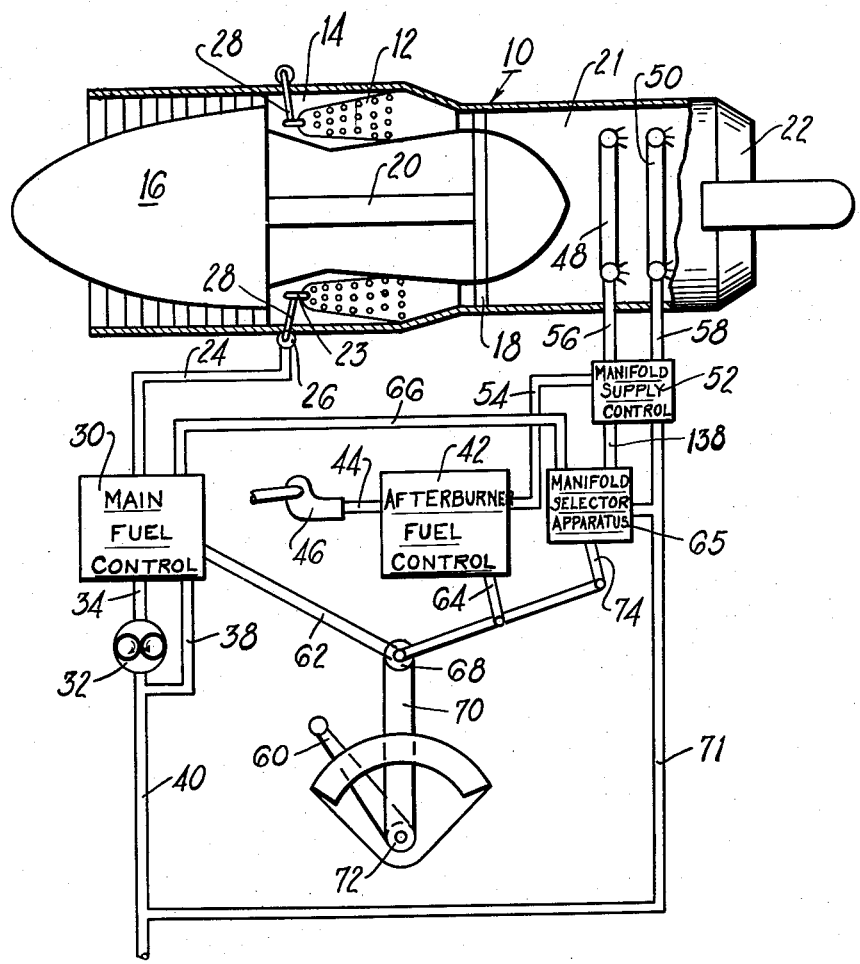
Figure 1 is a schematic view of a gas turbine engine equipped with a power control system including an afterburner fuel control system.

Referring to Figure 1, there is shown a gas turbine engine 10 which includes a series of annularly disposed combustion chambers 12 mounted in a casing having a header or air intake section 14 and a compressor 16 which is driven by means of a turbine 18 through a drive shaft 20. An elongated tailpipe 21 receives the hot gases of combustion which flow through the turbine 18 and conducts the gases to a variable area thrust or exhaust nozzle 22 which discharges into the atmosphere. Each of the combustion chambers is provided with a burner nozzle 23 to which metered fuel is supplied under pressure by way of a conduit 24, a main fuel manifold 26 and individual fuel lines 28. The fuel conduit 24 receives metered fuel from a main fuel control device 30, which may be of the type disclosed in copending application Serial No. 499,432, filed April 5, 1955, in the names of H. J. Williams, F. R. Rogers and B. J. Ryder and assigned to the same assignee as the present invention.

A main fuel pump 32 supplies fuel under pressure to the main fuel control 30 through a conduit 34 a portion of which fuel may be by-passed back to the main fuel pump 32 through a conduit 38 to the inlet conduit 40 of the main fuel pump 32.

An afterburner fuel control 42 receives fuel under pressure through an inlet conduit 44 from a centrifugal afterburner fuel pump 46 and is operative to meter said afterburner fuel to a plurality of afterburner manifolds 48 and 50 through a manifold supply control 52. The metered afterburner fuel passes from the afterburner fuel control 42 to the manifold supply control 52 through a fuel conduit 54, and from the manifold supply control 52 to the respective afterburner manifolds 48 and 50 through respective fuel conduits 56 and 58. A control throttle member 60 is provided for the manual control of the gas turbine engine by the aircraft pilot, which control throttle member 60 is operatively connected to the main fuel control 30 through linkage arm 62 and to the afterburner fuel control through linkage arm 64. A manifold selector apparatus 65 is provided for controlling the supply of fuel to the manifolds 48 and 50. The manifold selector apparatus 65 is connected to the throttle member 60 through linkage arm 74. Control fuel for the manifold selector apparatus 65 is supplied at a first and predetermined reference pressure $P_R$ from the main fuel control 30 through fuel conduit 66. Control fuel at a second pressure $P_0$ is supplied from the inlet conduit 40 of the main fuel pump 32 through the fuel conduit 71 connected to both the manifold supply control 52 and the manifold selector apparatus 65. The linkage arms 62, 64 and 74 are controlled by a driven pulley 68 which is driven through a positive action flexible cable 70 by a driver pulley 72 connected to the control throttle member 60, such that the driven pulley 68 rotates and assumes an angular position corresponding to the rotary movement or angular position of control throttle member 60.

The afterburner fuel control 42 may be of the type disclosed in copending application Serial No. 520,722, filed July 8, 1955, by H. J. Williams, and assigned to the same assignee as the present invention.

Figure 2:
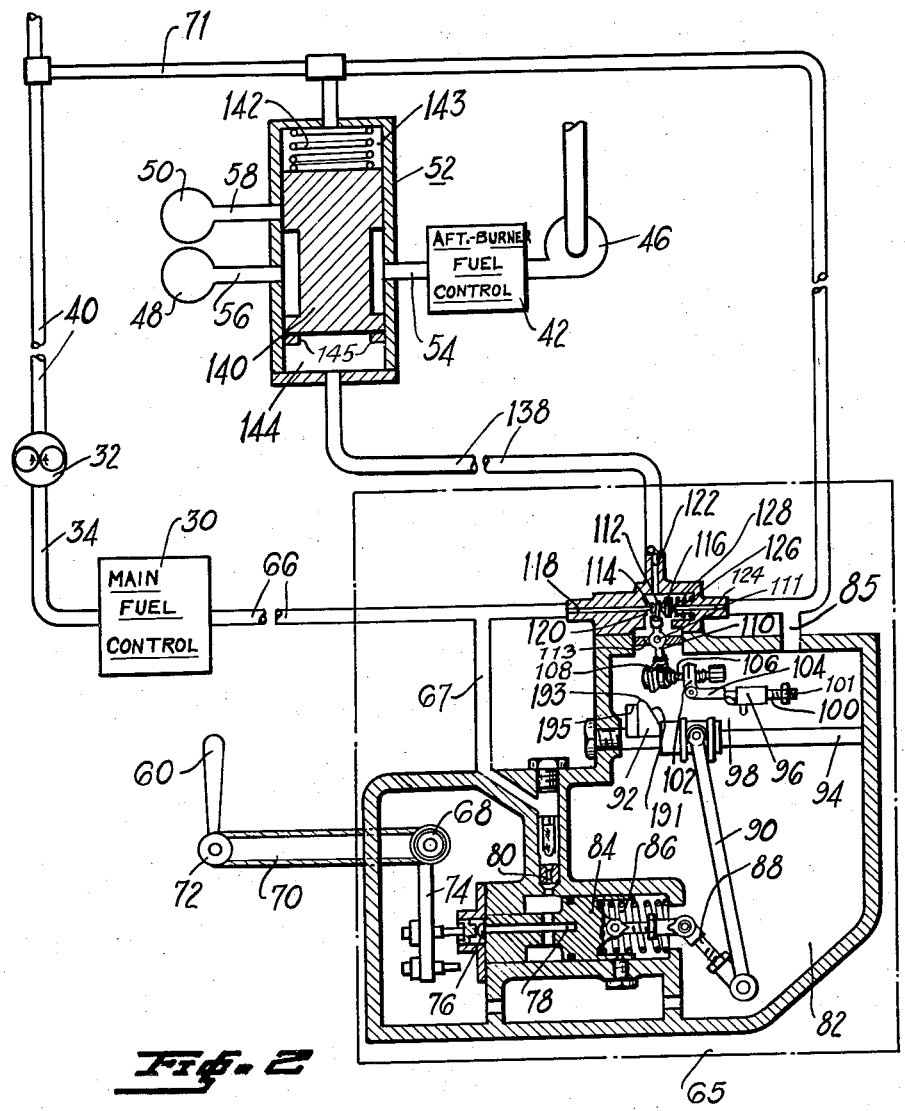
Figure 2 is a sectional schematic of the afterburner fuel control apparatus in accordance with the present invention.

Referring to Figure 2, there is shown the control throttle member 60 and the driver pulley 72 which controls the movement of a driven pulley 68 through the positive action flexible cable 70. The driven pulley 68 is connected to a control lever 74 which controls the position of a servo pilot valve or half-ball type servo control valve 76 to thereby vary the pressure of the control fuel within fuel chamber 78. Control fuel at predetermined pressure $P_R$ is supplied through fuel conduit 66 and branch fuel conduit 67 from the main fuel control 30. A servo bleed 80 is operative to provide control fuel at pressure $P_X$ which enters the fuel chamber 78. Control fuel at pressure $P_0$ is supplied to fuel chamber 82 through fuel conduit 85 such that the movement of the control piston 84 is determined by the servo valve controlled fuel pressure $P_X$ within the fuel chamber 78 acting on one side of the piston 84 against the force of the compressed spring member 86 and the force of the control fuel at pressure $P_0$ within the fuel chamber 82 acting on the other side of the piston 84 control fuel pressure $P_R$ is greater than control fuel pressure $P_0$. The control or power piston 84 is connected through a first linkage arm 88 and a second linkage arm 90 to control the axial movement of a cam member 92 along support shaft 94. A cam follower member 96 is provided with a roller 98 which rides on the surface of cam member 92 and is axially movable along support shaft 100. The support shaft 100 is provided with splines (not shown) which the follower member 96 is slidably engaged axially and which prevent rotational movement of the follower member 96 relative to the support shaft 100.

The support shaft 100 is connected to a support member 102 which is pivotally supported about a support shaft 104 and further carries a contact arm 106 that is adapted to contact and push against a contact button 108, which in turn is fastened to a pivot shaft 110. The pivot shaft 110 is carried by a pin 111 secured to a supporting member 113. The supporting member is fixed in position through any suitable means not shown such as conventional snap rings. The latter pivot shaft 110 has a second contact arm 112 which is positioned between and adapted to respectively move one or the other of a pair of servo control valves 114 and 116. The first servo control valve 114 is operative to connect or disconnect a path for control fuel at reference pressure $P_R$ from a first fuel conduit 118 and through the servo seat 120 for the first servo control valve 114, and out through the output fuel conduit 122. The second servo control valve 116 is operative to connect or disconnect a fuel path between a third fuel conduit 124 through which control fuel at a second pressure $P_0$ passes and through the seat 126 for the second servo control valve 116 and then through the outlet conduit 122. A compression spring 128 is provided for opening the servo control valve 116 when the control arm 112 moves away from the servo control valve 116 in that the pressure $P_0$ of the control fuel supplied through the fuel conduit 124 is in actual practice approximately 100 pounds per square inch less than the pressure $P_R$ of the control fuel supplied through the fuel conduit 118. In this respect the fuel conduit 118 is connected to the outlet fuel conduit 34 of the main fuel pump 32 through a servo pressure regulator unit within the main fuel control 30 such that fuel conduit 66 contains control fuel or fluid at pressure $P_R$. The fuel conduit 124 is connected to the inlet fuel conduit 40 of the fuel pump 32 through fuel conduit 71 such that the control fuel supplied through the fuel conduit 124 is at a pressure $P_0$ approximately 100 pounds per square inch less than the control fuel at pressure $P_R$ supplied to the fuel conduit 118.

The outlet fuel conduit 122 is connected to the manifold supply control 52 through a fuel conduit 138. The manifold supply control 52 includes a shuttle piston 140 which is operative against a compression spring 142 and control fuel at pressure $P_0$ within fuel chamber 143 by means of control fuel within the fuel chamber 144. Projections 145 extend from the lower surface of shuttle piston 140 and serve to limit the downward travel of the shuttle piston 140 in chamber 144. The illustrated position of the shuttle valve 140 is such that afterburner fuel supplied by the afterburner fuel pump 46 passes through the afterburner fuel control 42 and through the manifold supply control 52 into the first afterburner fuel manifold 48. This corresponds to a position of the pivot shaft 110 and the control lever 112 such that the fuel path from the fuel conduit 118 to the outlet fuel conduit 122 is closed by the first servo control valve 114 and the second servo control valve 116 is open to provide an open fuel path between the fuel conduit 124 and the outlet fuel conduit 122 for control fuel at pressure $P_0$. When the roller 98 comes into contact with the cam member 92 and rides up on the latter cam member 92, the control lever 112 closes the second servo control valve 116 and opens the first servo control valve 114 such that the shuttle valve member 140 is moved to compress the spring member 142, and the fuel from the afterburner fuel pump 46 can then also pass through the afterburner fuel control 42 and into the second afterburner fuel manifold 50.

In Figure 3 there is shown a modification of the apparatus shown in Figure 2. The manifold selector apparatus 65 is substantially the same as shown in Figure 2, except for the addition of a second control surface to the cam member 92, which second control surface is operative with an additional or second cam follower roller 175. The latter second roller 175 is connected through a linkage arm 177 that is pivoted about support connection 179 and operates against compression spring 173 to control the movement of a servo pilot valve or half-ball control valve 181 that is operative to control the flow of control fluid at some predetermined pressure, such as the output pressure $P_1$ of the fuel pump 32, from the fluid conduit 183 to the fluid conduit 185. The latter fluid conduit 185 is connected to supply this control fluid at pressure $P_1$ to the fluid chamber 144 for the purpose of controlling the shuttle valve 140 such that afterburner fuel from the fuel pump 46 and afterburner fuel control 42 is supplied only to second afterburner manifold 50. In addition there is provided a check valve 187 in fluid conduit 138 to prevent the control fluid at pressure $P_1$ from the fluid conduit 185 from reaching the output conduit 122. In this respect the shuttle valve can be positioned as desired to supply afterburner fuel to the first manifold 48 when the control throttle 60 is at an angular position of less than about 90 degrees, with control fluid at pressure $P_0$ being supplied to the fluid chamber 144 by virtue of the first cam follower roller 98 and the second cam follower roller 175 being not in contact with the cam member 92. For a throttle angle between about 90 degrees and 95 degrees, the first roller 98 will contact the first and lower control surface of the cam member 92 to supply control fluid at pressure $P_R$ to the fluid chamber 144 to position the shuttle valve 140 such that afterburner fuel is thereby supplied to both the first manifold 48 and the second manifold 50. For a throttle angle between about 95 degrees and 110 degrees, the second roller 175 will contact the second or upper control surface of the cam member 92 to supply, by opening the pilot control valve 181, control fluid at pressure $P_1$ to the fluid chamber 144 to position thereby the shuttle valve 140 such that afterburner fuel is supplied to the second manifold 50. It should be here noted that the fluid pressure $P_0$ is the lowest in value, fluid pressure $P_R$ is intermediate in value, and fluid pressure $P_1$ is the highest in value.

In the operation of the apparatus shown in Figures 1, 2 and 3 the position of the control throttle member 60 determines whether afterburner fuel is supplied from the afterburner fuel pump 46 and through the afterburner fuel control 42 to afterburner fuel manifold 48 and/or to afterburner fuel manifold 50. In the apparatus shown in Figures 1 and 2, when the manual control throttle 60 is moved to an angular position corresponding to about 95° the cam member 92 is moved axially to the right as shown in Figure 2 such that the cam follower roller 98 rides up on the contour surface of cam member 92 to thereby cause the movement of the control lever 112 to open the first servo control valve 114 and to close the second servo control valve 116 such that the first servo control valve 114 is opened to allow control fluid at pressure $P_R$ from the fuel conduit 118 to pass around the first servo control valve 114 and through the outlet conduit 122 to the fuel chamber 144. This positions the shuttle valve member 140 against the force of spring 142 such that afterburner fuel is allowed to enter the first afterburner fuel manifold 48 and the second afterburner fuel manifold 50 from the afterburner fuel pump 46 and the afterburner fuel control 42. When the control throttle member is at less than the above said angular position of about 95 degrees the roller 98 of cam follower member 96 is out of contact with the cam 92 such that the pusher arm 106 is out of contact with the contact button 108 and the control lever 112 and compression spring 128 are operative to close the first servo valve 114 and to open the second servo valve 116 to allow the control fuel at the lower pressure $P_0$ to pass from the fuel conduit 124 to the outlet fuel conduit 122. This lower pressure control fuel enters the fuel chamber 144 to cause the shuttle valve member 140 to be positioned as shown in Figure 2 such that afterburner fuel from the afterburner fuel pump 46 is introduced into only the first afterburner fuel manifold 48. In this respect it is to be understood that for an angular position of said throttle member 60 that is less than about 82° the afterburner fuel control 42 is operative to prevent the flow of afterburner fuel from the fuel pump 46 to the manifold supply control 52. For an angular position of the throttle member 60 that is greater than about 82° and less than about 95° the shuttle valve 140 is in the position as shown in Figure 2.

It should be noted that the cam follower member 96 is slideably positioned along the support shaft 100 such that when the cam member 92 moves into engagement with the cam follower member roller 98, the follower member 96 slides along the support shaft 100 subsequently coming to a fixed position against a nut 101 threadedly engaged with the support shaft 100 after which further movement of cam member 92 results in upward movement of the follower member 96. When the cam member 92 moves in the opposite direction to disengage the follower member roller 98, the top portion 193 of the cam engages the roller 98 such that the follower member 96 slides along the support shaft 100 until it comes to a fixed position against the support member 102 after which further movement of the cam results in downward movement of the follower member 96. In this respect it requires approximately two degrees of angular movement of the control throttle member 60 away from the above stated 95° position before the cam follower roller or ball 98 will engage or disengage the control cam 92 and thereby move the control lever 112 to open or close the respective first servo valve 114 and the second servo valve 116, as previously described. This avoids an on and off operation of the supply of afterburner fuel to the afterburner fuel manifolds 48 and 50 corresponding to one angular position of the throttle 60 which would be undesirable. In this respect the control apparatus is given a desirable hysteresis characteristic by this sliding movement of the cam follower member 96 along the support shaft 100. In this respect, the first and lower control surface of cam member 92 shown in Figure 2 includes a first inclined or rising portion 191, a peak or top portion 193 and an upper flat portion 195. The peak or top portion 193 is provided to improve the sliding movement of the cam follower member 96 along the support shaft 100.

It should be further noted that the angular position of the control throttle member 60 at which the shuttle valve 140 is moved to introduce afterburner fuel to the second fuel manifold 50, above described as being about 95 degrees, may be changed by adjusting the nut 101 on support shaft 100 to any desired portion. The latter connection member 101 is operative to vary this throttle angle as may be desired, i.e., 90° or 95° or 100° or 105°, and obviously almost any desired angular position of the control throttle member 60 can be made to do this by suitable adjustment of the connection member 101.

In the operation of the apparatus shown in Figure 3, afterburner fuel can be initially supplied to say the first manifold 48, then to both the first and second manifolds 48 and 50, and finally to the second manifold 50 by progressively advancing the angular position of the control throttle 60 from below about 90 degrees for example, to between about 90 degrees and 95 degrees, and finally to above about 95 degrees, respectively. By this apparatus the amount and the manner of supplying afterburner fuel to a gas turbine engine can be selectively controlled.

This invention contemplates the use of known types of servo mechanisms wherever needed to provide power operation.

Although only two embodiments of the present invention have been schematically illustrated and described, it will be apparent to those skilled in the art that various changes in the structure and relative arrangement of the parts may be made to suit individual requirements without departing from the scope and spirit of the present invention.

I claim:

1. In a fuel control apparatus for a gas turbine engine the combination of an engine control throttle member, a first fuel manifold and a second fuel manifold, a fuel control device for controlling the supply of fuel to the first fuel manifold and to the second fuel manifold, said control throttle member being operatively connected with a control cam, with the fuel control device including a cam follower operative with said control cam such that in response to a first position the throttle member will initiate the supply of fuel to the first manifold and in response to a second position of the control throttle member the control device will supply fuel jointly to first and second manifold and means operatively connected to said cam follower for delaying the response of said cam follower to the movement of said control throttle member whereby the control device will cut-off the supply of fuel to said second manifold at a third control throttle position.

2. The apparatus of claim 1 wherein said third control throttle position is between said first throttle position and said second throttle position.

3. The apparatus of claim 1, wherein said means includes a support shaft upon which said cam follower is slidably mounted, said cam follower being axially movable along said support shaft through a predetermined degree of movement.

4. In a fuel control device for a gas turbine equipped with afterburner apparatus, the combination of an engine control throttle member having a first position, a second position and a third position, a first afterburner fuel manifold, a second afterburner fuel manifold, a fuel control device for controlling the supply of fuel to said first and second afterburner fuel manifolds, with said control device including a first conduit for control fluid at a first pressure, a second conduit for control fluid at a second pressure and a third conduit for control fluid at a third pressure, with a first valve member positioned to close said first conduit, a second valve member positioned to close said second conduit and a third valve member positioned to open said third conduit, said control device further including a first pivot lever positioned between said first and second valve members and a second pivot lever connected to said third valve member, said first and second pivot levers being operative with said control throttle member such that in response to said first position and said second position of the throttle member the first valve member and the second valve member, respectively, are closed and in response to said third position of said throttle member the third valve member is opened, with said control device being operative to supply fuel to said first afterburner manifold only when the first valve member is closed and to supply fuel to said first and second afterburner manifolds when the second valve member is closed and to supply fuel to said second afterburner manifold only when said third valve member is opened.

5. The apparatus of claim 4 wherein said fuel control device includes a first cam member and a second cam member operatively connected to said throttle member and operable as a function of the position of said throttle member, a first cam follower which is operative with said first cam member and connected to said first pivot lever and a second cam follower which is operative with said second cam member and connected to said second pivot lever, and a support member for supporting said first and second cam members, said first and second cam members being axially movable along said support member such that when the throttle member is in its first position said first and second cam follower members are out of contact with their respective cam members and when the throttle member is in its second position the first cam follower member is in contact with said first cam member and when the throttle member is in its third position the second cam follower member is in contact with said second cam member.

References Cited in the file of this patent

UNITED STATES PATENTS

| | | |
|---|---|---|
| 1,751,172 | Reinhardt | Mar. 18, 1930 |
| 1,780,417 | Dillman | Nov. 4, 1930 |
| 1,952,147 | Stahl | Mar. 27, 1934 |
| 2,508,420 | Redding | May 23, 1950 |
| 2,658,330 | Carey | Nov. 10, 1953 |
| 2,737,165 | Thorner | Mar. 6, 1956 |

FOREIGN PATENTS

| | | |
|---|---|---|
| 656,876 | Great Britain | Sept. 5, 1951 |
| 712,329 | Great Britain | July 21, 1951 |

UNITED STATES PATENT OFFICE
CERTIFICATION OF CORRECTION

Patent No. 2,969,109                      January 24, 1961

Theodore B. Card

It is hereby certified that error appears in the above numbered patent requiring correction and that the said Letters Patent should read as corrected below.

Column 5, line 59, for "portion" read -- position --.

Signed and sealed this 15th day of August 1961

(SEAL)
Attest:

ERNEST W. SWIDER
Attesting Officer

DAVID L. LADD
Commissioner of Patents